Figure 1:
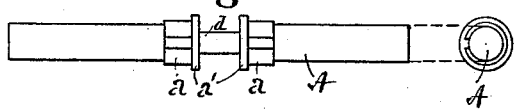

(No Model.)

J. B. STANWOOD.
MANUFACTURE OF CRANK SHAFTS.

No. 359,290. Patented Mar. 15, 1887.

Attest.
C. D. Kerr
E. L. Kerr

James B. Stanwood
Inventor.
By K. H. Hosea
Attorney.

UNITED STATES PATENT OFFICE.

JAMES B. STANWOOD, OF CLEVELAND, ASSIGNOR OF ONE-HALF TO THE LANE & BODLEY COMPANY, OF CINCINNATI, OHIO.

MANUFACTURE OF CRANK-SHAFTS.

SPECIFICATION forming part of Letters Patent No. 359,290, dated March 15, 1887.

Application filed December 13, 1886. Serial No. 221,386. (No model.)

*To all whom it may concern:*

Be it known that I, JAMES B. STANWOOD, a citizen of the United States, residing at Cleveland, Cuyahoga county, Ohio, have invented new and useful Improvements in the Manufacture of Crank-Shafts, of which the following is a specification.

My invention relates to a method of manufacturing and constructing crank-shafts for steam-engines and other machinery, its object being to cheapen the cost and improve the structure in respect to accuracy of fitting and alignment and to balancing the wrist-pin and connections.

The common methods of construction are various. In the earlier practice a forged shaft was bent to form a crank without any balancing attachments. To this a balancing-weight was sometimes attached on the side opposite the crank-pin, making an ungainly and expensive construction. Later the recessed circular plate for balancing was passed over the forged shaft and secured to the crank by metal keys. A later method was to use a cast-steel crank-shaft with a small circular plate or disk of the diameter of the crank outside, upon which disk a plate counter-balance with a circular aperture was fitted. In all these constructions the cost of fitting parts is considerable, especially where the crank and shaft are made in separate pieces and afterward fitted together, because, as will be obvious, absolute accuracy of alignment is essential to the proper working of the completed crank-shaft in connection with other mechanism. Differences in temperature of parts in work from frictional heating under tool-manipulations, differences in the quality of metal used, and various other impeding causes combine to make the construction of a crank-shaft out of separate pieces a matter of great expense and difficulty for large work, such as required in Corliss engines and other fine machinery requiring accurate fitting and operation.

In my improved construction I build up the crank-shaft from a straight homogeneous shaft without bending, in the following general manner: First, I form and complete the entire shaft as a single, continuous, and homogeneous piece of metal at one and the same operation; second, fit the crank-plates over the shaft from opposite ends and shrink or press them to the seats prepared for their reception, where they are firmly keyed; third, I bore the wrist-pin apertures at the same operation by means of a boring-tool placed upon and guided by the shaft itself, thus obtaining perfect alignment and parallelism with the shaft; and, fourth, fit the crank-pin to its seats, and then cut away the section of the shaft between the crank-plates.

The details of my invention will be rendered more clear by the following description, in connection with the following drawings, in which—

Figure 2:
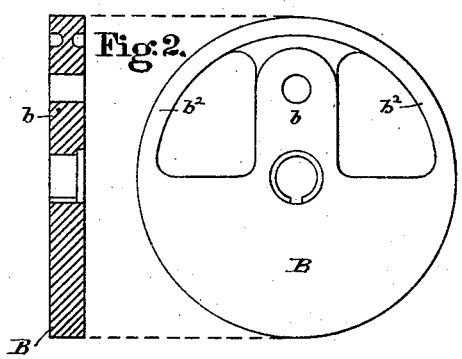
Figure 3:
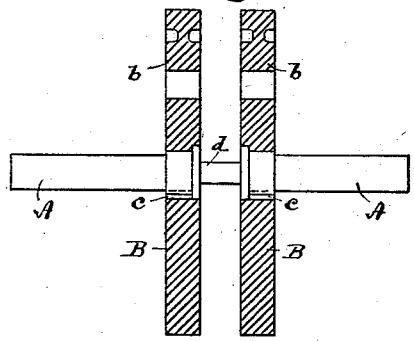

Figure 1 is a side and end view of the shaft turned and fitted to receive the crank-plates; Fig. 2, a face view and axial cross-section of one of the crank-plates ready to be placed upon the shaft; Fig. 3, a view of the shaft with cross-sections of the crank-plates in position, and Fig. 4 a similar view showing the crank-pin in place and the shaft completed.

Referring now to the drawings, A designates the shaft, which is lathe-dressed to the form shown in Fig. 1, with seats $a$ of somewhat increased diameter, terminating in holding flanges or collars $a'$, provided for the reception of the disks B. The latter I prefer to form, as shown, with apertures $b'$ at the sides of the crank proper, $b$, to gain the balancing-weight at the side opposite the crank, leaving the rim $b^2$ intact to assist the strength of the crank-arm.

Figure 4:
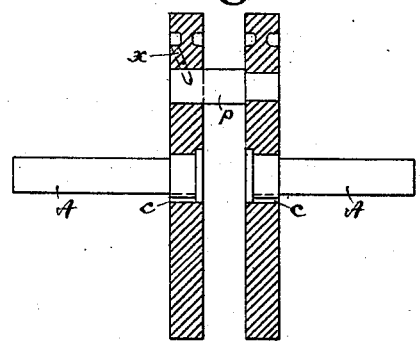

In casting, the apertures for the shaft and crank-pin are cored, and the shaft-aperture only is finished by the boring-tool before the disk is placed in its seat upon the shaft, the pin-aperture being left rough. The disks, being placed upon the shaft, as indicated in Fig. 3, are forced to their seats by pressure in opposite directions or by shrinking in the usual manner, and keys $c$, driven in the key-seats from opposite directions, holding the disks against their seat-flanges. The disks being firmly and properly seated, a boring-tool is placed upon the shaft and both the crank-pin apertures bored out parallel to the shaft at the same operation, thus insuring a perfectly parallel alignment with the shaft, after which the crank-pin $p$ is seated, as indicated in Fig. 4, by a forcing pressure and secured by a pin, $x$, (indicated by dotted lines,) and the central section, $d$, of the shaft cut away. A light finishing cut may be given the shaft in the lathe before or after removing the central section.

Thus constructed, the crank-shaft, as will be readily seen, involves no laborious processes and is comparatively inexpensive, while at the same time the alignment is absolutely true and perfect. The latter result is of the highest importance, and cannot be attained except approximately by any other known method of construction without unduly expensive manipulation.

I claim as my invention and desire to secure by Letters Patent of the United States—

The improved method of constructing double crank-shafts, consisting in, first, truing and fitting for the reception of the crank-plates a single homogeneous shaft; second, fitting the crank-plates to their seats; third, boring the crank-pin seats with the shaft as a guide for the boring-tool; fourth, fitting and securing the crank-pin connecting the disks, and, fifth, cutting away the superfluous central section of the shaft, substantially as set forth.

In testimony whereof I have hereunto set my hand in the presence of two subscribing witnesses.

JAMES B. STANWOOD.

Witnesses:
 CHAS. E. NEWELL,
 ALONZO YATES.